Dec. 3, 1957  W. H. TANKE  2,814,976
TRACTOR HITCH
Filed Oct. 26, 1956

Inventor
Willard H. Tanke
by T. Lloyd LaFaive
Attorney

United States Patent Office 2,814,976
Patented Dec. 3, 1957

2,814,976

TRACTOR HITCH

Willard H. Tanke, La Crosse, Wis., assignor to Allis-Chalmers Manufacturing Company, Milwaukee, Wis.

Application October 26, 1956, Serial No. 618,635

8 Claims. (Cl. 97—47.63)

This invention relates to tractor hitches, and it is concerned more particularly with a device for converting implements of the three point hitch type to implements of the single point hitch type.

A three point hitch type implement as herein referred to is an implement having two lower laterally spaced hitch points and one upper hitch point in rigid relation to each other and adapted for connection to a tractor by means of a three point hitch linkage such as shown for instance, in U. S. Patent 1,687,719, H. Ferguson, October 16, 1928. Generally, the three point hitch linkage includes a pair of lower laterally spaced draft transmitting or tension links connected to the tractor at laterally spaced points and connectable to the implement at the mentioned lower laterally spaced hitch points, and an upper compression link connected to the tractor above the lower two links and connectable to the implement at the mentioned upper hitch point. The upper compression link and lower tension links operate to guide the implement up and down relative to the tractor, with the upper compression link serving additionally to actuate a control mechanism for operating the tractor power lift arms in response to compression forces acting on the compression link.

As referred to herein, a single point hitch type implement, on the other hand, has a single point draft connection with the tractor and does not require linkage other than draft transmitting linkage to actuate a draft responsive control mechanism for operating the power lift arms on the tractor. Such a hitch is shown, for instance, in U. S. Patent 2,732,784, W. H. Tanke, January 31, 1956.

An implement of the single point hitch type also provides two laterally spaced points of connection for draft linkage. However, such spacing is usually not the same for different implements, and the spacing between the lower implement hitch points varies between single point and three point hitch type implements and also between implements of different manufacturers. Similarly, the upper hitch point is not uniformly spaced from the axis of the lower hitch points between different implements made for the three point hitch system.

The present invention is concerned with a hitch which lends itself for use with tractors equipped with a single hitch point system. More specifically, the hitch of the present invention is such that it may be used not only with implements designed for attachment to a single hitch point system but also with implements designed for attachment to a three point hitch system. The hitch of the present invention may therefore be used for converting a three point hitch implement to a single point hitch implement so that the three point hitch implement may be used with a tractor designed for use with a single point hitch type implement.

A hitch as heretofore provided for converting a three point hitch type implement to a single point hitch type implement has not been entirely satisfactory, particularly with respect to such a hitch being useful for converting different three point hitch implements or also useful with single point hitch implements having different spacing between the hitch points.

Generally, it is an object of the present invention to provide an improved hitch for attaching three point hitch implements to a single point hitch tractor.

More specifically it is an object of the invention to provide a hitch for interchangeably attaching to a tractor equipped with a single hitch point system, implements designed for that system or implements designed for tractors using a three point hitch system.

Another object of the invention is to provide an improved hitch of the herein above outlined character which lends itself for use with implements having widely different spacings between their hitch points.

Other objects and advantages of the subject conversion hitch will be apparent upon a reading of the following description with the accompanying drawings, in which.

Figure 1:
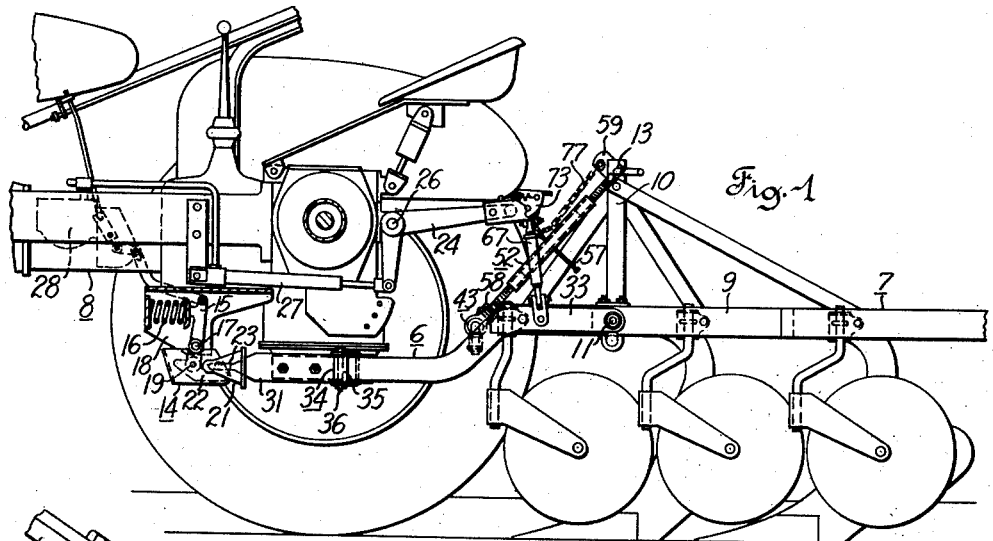
Fig. 1 is a view in elevation showing a hitch that attaches an implement to a rear portion of a tractor with the near rear wheel of the tractor removed.
Figure 3:
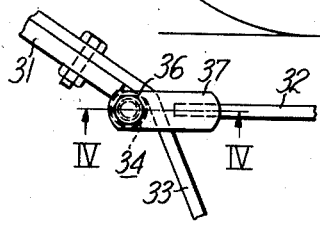
Fig. 3 is a plan view of the hinge portion of the linkage of the hitch shown in Fig. 2.
Figure 4:
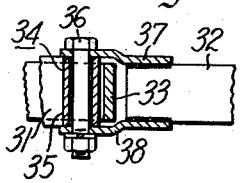
Fig. 4 is a sectional view taken along the line IV—IV in Fig. 3.

Referring to the drawing by characters of reference numeral 6 represents a hitch constructed and arranged for attaching a three point hitch implement 7 to a tractor 8. Implement 7 is a conventional plow having a frame 9 and a tower 10 rigid with frame 9 providing a well known arrangement of two laterally spaced hitch points 11 on a transverse axis and a third hitch point 13 spaced vertically of the axis of hitch points 11. A hitch linkage comprising an upper compression link and a pair of rigid lower tension links would be employed to connect this implement to a three point hitch tractor.

The tractor 8 is conventional and employs a single hitch point system in which a drawbar or implement tongue is connected at a single point in draft transmitting relation with the tractor. The tractor 8 has a hitch yoke 14 depending from its main body.

The hitch yoke comprises a draft control lever 15 biased by a spring 16. Lever 15 is pivotally supported on a rod 17 extending through a bracket 18 rigid with the tractor. A transversely disposed pivot pin 19 at the lower end of lever 15 supports a quick hitch coupler having a funnel shaped housing 21 which pivotally supports a latch member 22. Latch member 22 defines a single hitch point that detachably engages an eye 23 in the forward end of the draft structure of hitch 6 and cooperates therewith to provide a draft connection permitting universal swinging movement of the hitch relative to the tractor.

The tractor has laterally spaced power lift arms 24 mounted on a transversely positioned rock shaft 26 operatively connected to a hydraulic actuating mechanism including a ram 27, a pump 28, and a valve mechanism, not shown, manually controlled by suitable means selectively permitting manual or automatic control of the lift arms in response to the propelling force required of the tractor, as shown in U. S. Patent 2,679,199, W. F. Strehlow, May 24, 1954.

The subject articulated hitch 6 includes a wishbone shaped draft transmitting structure having a single forwardly extending hitch portion 31 having its forward end including the eye 23 adapted for connection to the latch 22 on the tractor. The trailing portion of the wishbone structure of the hitch is A shaped and comprises a pair of pivotally interconnected generally laterally spaced tension members 32, 33 that are forwardly convergent with each other to a point of connection with the single forwardly extending member 31. While the forward member 31 may include two vertical pivots for connecting the tension members, the forward member preferably is integral with the one tension member 33 and a hinge or pivot means 34 is mounted thereon for connecting the other tension member 32 in laterally swingable relation therewith. Such pivot means 34 includes a vertical sleeve bearing 35, secured as by welding to the juncture of the forward member 31 and the tension member 33. A vertical pivot axis is provided by a bolt 36 disposed in the sleeve bearing 35. A pair of apertured straps 37, 38 provide a forked end to tension member 32. The straps are positioned above and below tension member 33 with the bolt 36 extending through the sleeve bearing and through the apertures in the straps.

Pivot means comprising spherical pivots 41, 42 at the rearward ends respectively of tension members 32, 33 are adapted for connection with the laterally spaced hitch points 11 on the implement to connect the tension members in vertically swingable relation to the implement on a transverse axis.

Figure 2:
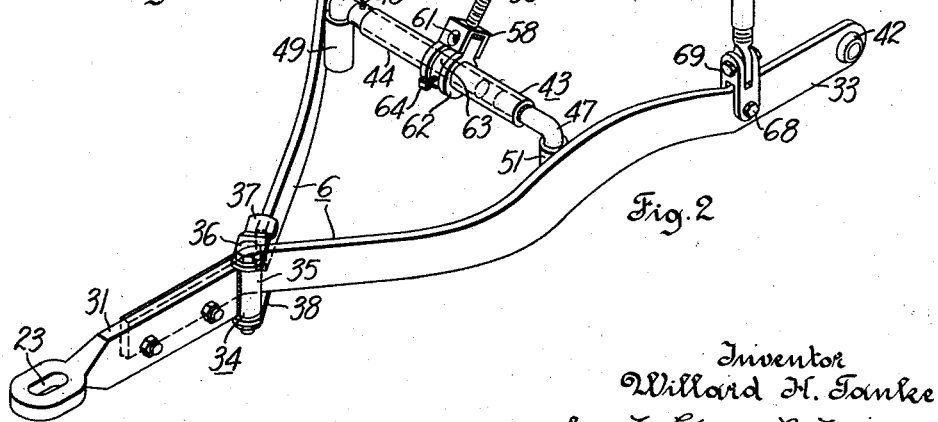
Fig. 2 is an isometric view of the hitch shown in Fig. 1 having hinged convergent portions.

A cross member 43 is mounted between the tension members 32, 33 at points spaced from the hinge means 34 and forwardly of the trailing ends of the tension member and the transverse axis thereof. The cross member is constructed and arranged to be rigid transversely of the cross member and adjustable longitudinally to vary the spacing between the trailing ends of the tension members. As shown in Fig. 2, the cross member 43 is extensible and contractible and comprises a sleeve 44 and a pair of L shaped pivot members 46, 47.

The L shaped pivot members are bent rods with aligned horizontally disposed ends disposed in the sleeve. One pivot member 47 is welded to the sleeve and the other pivot member 46 is longitudinally or telescopically slidable in the sleeve 44. A set screw 48 may be mounted directly on the sleeve 44 to secure pivot member 46 against longitudinal movement in the sleeve 44 or as shown a stop collar with the set screw 48 therein may be mounted on pivot member 46 to provide a stop for selected minimum lateral spacing of the trailing ends of the tension members. The vertically depending portions of the pivot members 46, 47 are disposed in vertically positioned sleeve bearings 49, 51 which are welded to the tension members 32, 33.

A compression link 52 or beaming screw member is mounted and supported on the cross member 43 to be vertically swingable relative to the tension members 32, 33. The beaming screw comprises oppositely threaded spaced screws 53, 54 in threaded engagement with opposite ends of a sleeve nut 56 provided with a crank 57 for turning the sleeve on the screws for adjusting the length of the compression link 52. The screws 53, 54 are each rigidly secured to mounting brackets 58, 59. Bracket 58 is secured by a pin 61 to a forked collar rotatably mounted on sleeve 44 of the cross member 43. A collar 63 is disposed on sleeve 44 in the intermediate space of the forked collar 62 and a set screw 64 in collar 63 bears on sleeve 44 to fix the forked collar against lateral movement on the sleeve 44. Bracket 59 at the free end of the beaming screw is adapted to be attached to the upper hitch point 13 in the tower 10 of the implement.

The bracket 59 and associated parts afford coupling means at the free end of the link member 52 for connecting the latter with a portion of the implement in upwardly spaced relation to the transverse axis of the hitch points 11.

The cross member 43 and associated sleeve bearings 49, 51 represent thrust transmitting means which are operatively associated with the link member 52 at one end of the latter and with the tension members 32, 33 forwardly of the transverse axis of the hitch points 11, so as to mount the link member 52 on the tension members 32, 33 in longitudinal thrust transmitting, vertically swingable relation thereto and so as to accommodate lateral swinging movement of said tension members toward and away from each other.

The hitch 6 is also provided with lift transmitting links 66, 67 adapted for connection with lift arms 24 of the tractor 8. Lift transmitting links 66 and 67 are each pivotally attached by a bolt 68 extending through a clevis 69 on each side member. The upper ends of the lift links include a knuckle piece 71 having a latch pin 72 adapted to be pivotally mounted in the jaws of a socket structure 73 attached to the lift arms 24 of the tractor for detachable connection therewith.

Suitable sway chains 76, 77 have ends connected to bracket 59 at the free end of the compression link 52 and opposite ends connected to the bolts extending through the upper clevises 71 of the lift links 66, 67, respectively. The sway chains limit lateral movement of the implement relative to the tractor and retain the compression link in an inclined elevated position when the compression link is detached from the implement.

In summary:

My invention comprises an A-type device for hitching an implement to a tractor. The device has two tension members 32, 33 joined together by a pivot or hinge means 34. At their converging ends the tension members are connected to a forward hitch portion or coupling element 31 including an eye 23 that is connected to the tractor. At their diverging ends the tension members are connected to the implement.

The tension members are interconnected by a thrust transmitting means. The thrust transmitting means comprises a cross member 43 and means 49, 51 pivotally connecting said cross member 43 with said tension members. Means 49, 51 mount said cross member at its opposite ends 46, 47 on said tension members for pivotal movement.

Thrust transmitting means 43, 49, 51 also mount a compression link member 52 that carries a coupling means 59 at its end for connection to the implement.

Compression link 52 is connected in axially slidable relation with sleeve or tube element 44, of cross member 43, by a mounting element comprising forked collar 62.

Mounting element 62 is secured in selected axially adjusted positions on tube element 44 by locking means comprising collar 63 and set screw 64.

A stop collar and set screw 48 constitute a stop means to control the amount of movement of tension member 32, 33 relative to each other.

Finally, carried by tension members 31, 33 for attachment to the power lift arms of the tractor are lift transmitting pivot means 66, 67, 68, 69, 71 and 72.

One embodiment of the present hitch has been shown and described and it should be obvious to those skilled in the art that various changes may be made therein within the spirit of the invention and the scope of the appended claims.

What is claimed is:

1. A hitch for connecting an implement to a tractor, comprising a draft transmitting structure having a forward hitch portion for connection to the tractor and a pair of pivotally interconnected tension members extending rearwardly from said hitch portion in laterally swingable relation to each other; pivot means at the rearward ends, respectively, of said tension members adapted for connection with said implement in vertically swingable relation thereto on a transverse axis; a link member; thrust transmitting means operatively associated with said link member at one end of the latter and with said tension members forwardly of said transverse axis so as to mount said link member on said tension members in longitudinal thrust transmitting, vertically swingable relation thereto and so as to accommodate lateral swinging movement of said tension members toward and away from each other, and coupling means at the other end of said link member for connecting the latter with a portion of said implement in upwardly spaced relation to said transverse axis.

2. A hitch as set forth in claim 1, and further comprising stop means associated with said thrust transmitting means for controlling said lateral swinging movement of said tension members relative to each other.

3. A hitch as set forth in claim 1 and further comprising lift transmitting pivot means associated, respectively, with said tension members for attaching tractor operated lift links thereto.

4. A hitch for connecting an implement to a tractor, comprising a draft transmitting structure having a forward hitch portion for connection to the tractor and a pair of pivotally interconnected tension members extending rearwardly from said hitch portion in laterally swingable relation to each other; pivot means at the rearward ends, respectively, of said tension members adapted for connection with said implement in vertically swingable relation thereto on a transverse axis; an extensible and contractable cross member extending between said tension members forward of said transverse axis, means pivotally connecting said cross member at its opposite ends, respectively, with said tension members so as to permit lateral swinging of said tension members relative to each other; a compression link pivotally mounted at one of its ends on said cross member for vertical swinging movement of its other end relative to said tension members; and coupling means for swingably connecting said compression link at said other end with said implement at a point in vertically spaced relation to said transverse axis.

5. A hitch as set forth in claim 4, wherein said cross member comprises a tube element and a rod element telescopically mounted within said tube element, each of said tube and rod elements having a radially extending pivot pin at its outer end, said pivot pins being mounted on said tension members, respectively, for rotary movement relative thereto on vertical axes.

6. A hitch as set forth in claim 5 and further comprising a stop collar mounted on said rod element for selective adjustment axially thereof and in axially abuttable relation to the adjacent end of said tube element, and collar locking means for securing said stop collar in selected axially adjusted positions on said rod element.

7. A hitch as set forth in claim 6 and further comprising a mounting element for said compression link connected in axially slidable relation with said tube element, and locking means for securing said mounting element in selected axially adjusted positions on said tube element.

8. A device for hitching a tractor to an implement having a pair of laterally spaced lower hitch points and an upper hitch point in rigid relation to each other, said device comprising a pair of tension members having rearward ends adapted for pivotal connection to said implement at said lower hitch points respectively; a coupling element at a forward portion of one of said tension members adapted for connection at a single point in draft transmitting relation with said tractor, hinge means pivotally connecting the other of said tension members and said one side member at a portion of the latter rearwardly of said coupling element in laterally swingable relation to each other, a contractable and expandable cross member extending between said tension members forwardly of their rearward ends; means mounting said cross member at its opposite ends on said tension members so as to accommodate swinging movement of said tension members towards and away from each other about the center of said hinge means by contracting and expanding movement of said cross member and by angular movement of the latter relative to said tension members about the axes of said pivot means; and a contractable and expandable link having one of its ends mounted on said cross member and the other of its ends adapted for pivotal connection to said upper hitch point on said implement.

No references cited.